United States Patent Office 3,226,205
Patented Dec. 28, 1965

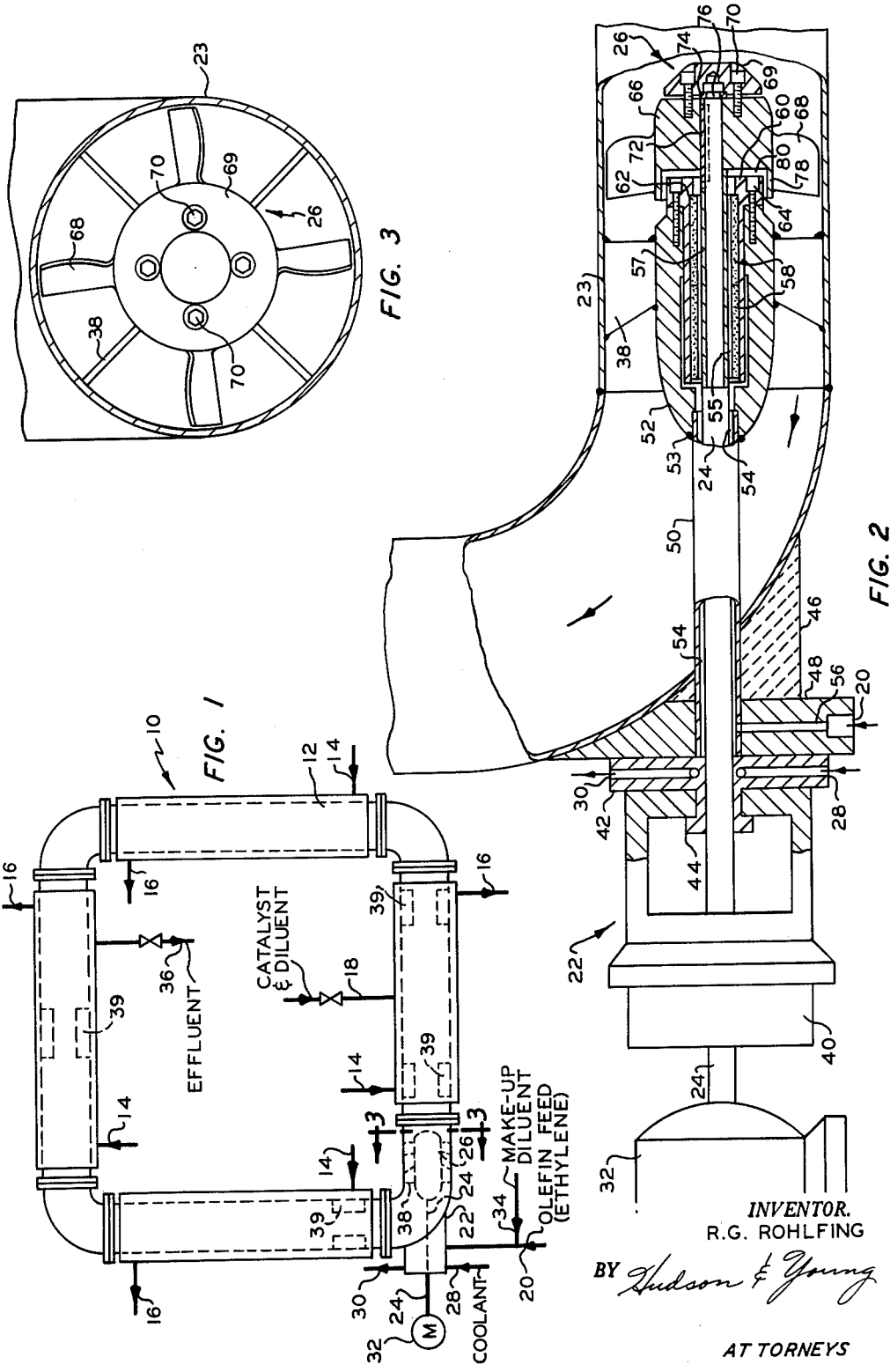

3,226,205
REACTOR IMPELLER WITH FEED INLET ALONG SHAFT
Raymond G. Rohlfing, Bartlesville, Okla., assignor to Phillips Petroleum Company, a corporation of Delaware
Filed Oct. 3, 1960, Ser. No. 59,991
4 Claims. (Cl. 23—288)

This invention relates to an improved polymerization reactor suitable for effecting polymerization reactions.

A unique reactor in the form of a continuous upright loop and a polymerization process effected therein are disclosed in the application of Norwood, S.N. 819,391, filed June 10, 1959, entitled "Method and Apparatus for the Production of Solid Polymers of Ethylene," now abandoned. In the disclosed process, solid particulate polymer insoluble in the hydrocarbon diluent used in the process is continuously formed. Deposition of the polymer is prevented by maintaining the fluid flow rate thru the reactor in the high turbulence range. The high turbulent flow is effected by one or more impellers positioned coaxially within a section of the loop conduit and operated by a shaft extending thru an outboard bearing. The inner end of the shaft is supported by an inboard bearing positioned adjacent the impeller.

In conducting the process in the reactor of said application, polymer gradually deposits on the inboard bearing and in the area between the impeller hub and the bearing so that after about 3 to 5 days of continuous operation, shut down is required in order to remove the polymer and permit continuous operation of the impeller. This invention provides means and method of operating such a device while preventing deposition of polymer in the impeller area, thereby avoiding the necessity of shut-down to remove the polymer.

Accordingly, it is an object of the invention to provide an improved apparatus for producing solid particulate form polymers. Another object is to provide an improved apparatus comprising an impeller operated on a shaft supported on an inboard bearing within a reactor which prevents or greatly reduces the deposition of solid polymer in the impeller and bearing area. Other objects of the invention will become apparent upon consideration of the accompanying disclosure.

The foregoing objects are realized, broadly, by introducing gaseous feed to the reaction zone thru a conduit or sleeve enclosing the impeller shaft so that the fluid feed flows thru the inboard bearing and the area adjacent the hub of the impeller and said bearing. In this way the area adjacent the inboard bearing and impeller hub is maintained free of polymer.

While the invention is particularly advantageous when utilized in a continuous loop reactor of the character described in the above-identified application, it is applicable to any reactor or process in which polymer or other solid material tends to deposit around an impeller hub and inboard bearing supporting the impeller shaft.

A polymerization process in which the invention is particularly advantageous involves the polymerization of 1-olefins having a maximum of 8 carbon atoms per molecule and no branching nearer the double bond than the 4-position. Examples of olefins which can be polymerized by the process include ethylene, propylene, 1-butene, 1-pentene, and 1,3-butadiene. Copolymers, such as ethylene-propylene copolymers and ethylene-butadiene copolymers, can also be prepared by utilizing a chromium oxide-containing catalyst. The temperature for the polymerization reaction is usually in the range of about 100 to about 500° F. with a temperature in the range of 275 to 375° F. being often preferred for the polymerization of ethylene. The olefins are polymerized in the presence of a hydrocarbon diluent, for example, an acyclic, alicyclic or aromatic compound which is inert.

A catalyst effective in the polymerization process comprises, as an essential ingredient, chromium oxide including a substantial amount of hexavalent chromium. The chromium oxide is associated with at least one other oxide selected from the group consisting of silica, alumina, zirconia, and thoria. A more detailed disclosure of the polymerization process which produces solid polymers is found in Hogan et al., U.S. Patents 2,825,721. The broad operating conditions include a temperature in the range of about 100 to 500° F. with a preferred temperature range of 275 to 375° F. for the polymerization of ethylene. When operating in the temperature range of about 150 to 225° F., which is a rather critical range within the temperature range disclosed by said patent, it is possible to produce increased yields of high molecular weight polymers of ethylene which are insoluble in the hydrocarbon diluent. This polymer is formed in association with the polymerization catalyst and is suspened in the liquid diluent in solid particle form.

The preparation of insoluble particle form polymer is disclosed in the copending application of Leatherman et. al., S.N. 590,567, filed June 11, 1956, now abandoned. In the discussion herein, the term "particle form polymer" designates the insoluble polymers of ethylene formed in accordance with the process of the Leatherman et al. application.

Particle form polymer can be prepared from ethylene and from mixtures of ethylene with other unsaturated hydrocarbons, for example, mixtures of ethylene with minor amounts of higher 1-olefins, such as propylene, 1-butene, 1-pentene, 1-hexene, and the like. Examples of comonomers which can be used with ethylene include 1-olefins having no branching nearer the double bond than the 4-position and conjugated and non-conjugated diolefins. The polymerization reaction is carried out in the presence of a liquid hydrocarbon diluent which is inert in the polymerization reaction and in which the polymer is insoluble under reactor conditions. Suitable diluents include paraffins such as those having from 3 to 12 and preferably 3 to 8 carbon atoms per molecule, for example, n-butane, n-pentane, isopentane, n-hexane, n-decane, etc., saturated cyclic hydrocarbons such as cyclohexane, cyclopentane, methylcyclopentane, methylcyclohexane, etc. The polymerization reaction temperature to be used will vary, depending on the particular liquid diluent which is employed and on the olefin reactants. Usually, however, polymerization is carried out at 230° F. and below, preferably between about 225° F. and about 150° F. The olefin reactants are contacted in the polymerization zone with a suspension of subdivided chromium oxide catalyst in the liquid hydrocarbon diluent at the aforementioned temperatures and under pressures suitable to maintain the diluent in the liquid phase. Concentration of the catalyst in the reaction zone can vary widely; however, generally it will be in the range of 0.001 to 5 percent by weight based on the liquid hydrocarbon diluent. For a more detailed description of the polymerization process including reaction conditions, catalyst, etc., reference can be had to said copending application of Leatherman et al.

A more complete understanding of the invention may be had by reference to the accompanying schematic drawing of which FIGURE 1 is an elevation of an upright loop reactor; FIGURE 2 is an elevation in partial section of the impeller section of FIGURE 1; and FIGURE 3 is a transverse cross sectional view of the impeller of FIGURE 1 taken on the line 3—3.

Referring to FIGURE 1, reactor 10 which is a rectangular shaped upright loop reactor is of flanged straight pipe sections and L's joined together to provide a continuous path which is substantially free from obstructions and has smooth inside walls. Each straight pipe section is jacketed by sections 12 which contain inlet 14 and outlet 16 for introduction and removal, respectively, of heat exchange fluid. Conduit 18 is provided for introduction of catalyst and diluent. This conduit may be located either upstream or downstream of the hereinafter described impeller. The olefin feed is introduced thru line 20 into outboard seal and bearing assembly 22 from which is passes along shaft 24 and into the reactor space around impeller 26 positioned in L 23 which will be more fully described in connection with FIGURE 2.

Bearing coolant is introduced thru line 28 and vented thru line 30. Motor 32 is operativaly connected with shaft 24 for operating impeller 26. Makeup diluent is introduced thru line 34 to line 20 from which it passes along shaft 24 to the impeller. The diluent introduced to line 18 along with catalyst is usually diluent recovered from the effluent withdrawn thru line 36. Since this diluent contains some polymer, it is unsuitable for introduction into line 20.

Referring to FIGURE 2, the bearing seal assembly 22 comprises an outboard bearing 40 of any suitable type for supporting the outer end of shaft 24. A sealing ring 42 and a packing gland 44 are provided to seal the shaft outside of the reactor L 23. The bearing sealing assembly is attached to L 23 by means of a housing support 46 welded to L 23 and to member 48. A sleeve 50 extends from within member 48 to the inboard bearing housing 52 to which it is sealed by weld 53. Sleeve 50 provides a passageway 54 with shaft 24 and connects with passageway 56 to which line 20 it attached for injecting ethylene or other polymerizable olefin into the reactor as will be seen from the ensuing description of the inboard bearing and impeller detail.

Inboard bearing housing 52 is attached to the wall of the reactor at three or four uniformly circumferentially spaced radial positions by radial supports 38 which are thin plates extending longitudinally of the reactor tube to provide as little resistance to flow as possible. The preferred arrangement of these supports is 120° apart, utilizing three in the assembly. Supports 38 also serve as straightening vanes in the area just downstream of impeller 26. Straightening vanes 39, extending longitudinally and radially of the loop conduits are also provided in other sections of the loop as shown in FIGURE 1. Shaft 24 extends thru housing 52 and is provided with a shaft sleeve bearing 57 of a suitable hard metal or alloy. A pair of bushings 58 encircle bearing sleeve 57 with about 10 to 30 thousandths of an inch clearance therewith to provide an extension 55 of passage 54 between the shaft and bushings. The bushings 58 are held in position by bearing shell 60 which is provided with a shoulder 62 adapted to engage the outer end of the outermost bushing. Cap screws 64 attach bushing shell 60 to housing 52.

The impeller 26 comprises a hub 66 to which are radially attached a plurality of blades 68. A lock collar 69 is attached to the end of hub 66 by means of cap screws 70. Hub 66 is keyed to shaft 24 by means of key 72. Lock ring 74 is fitted in groove 76 on the outer end of the shaft and engages the end of hub 66 to hold the same in place on the shaft.

A skirt or flange 78 on the back end of the hub surrounds the forward end of the bearing assembly and forms a passageway 80 therewith which connects with the bushing clearance passageway 55 and thereby with passageway 54 to complete the path for the olefin feed injected thru the sleeve and bearing assembly. Impeller blades 68 are angled about 18° to force liquid in the ell in the direction shown by the arrows. In this manner, the flow of ethylene or other olefins, devoid of polymer, thru the bearing assembly and along the hub prevents polymer deposition and keeps the same free for continuous operation.

FIGURE 3 shows impeller 26 and bearing support members 38 positioned within ell 23. It is to be understood that the number of supports 38 and impeller blades 68 may vary from that shown in this figure.

In preferred operation, all of the olefin feed to the reactor is injected thru the passageway along the sleeve-shaft annulus and thru the bearing-impeller hub assembly. This assures the prevention of polymer build up in the inboard bearing and between the impeller hub and the inboard bearing assembly. However, it is feasible to introduce a portion of the olefin feed directly into the reactor as thru line 18, along with catalyst and diluent, or thru a separate inlet upstream or downstream of the impeller.

It is to be understood that the details of construction with respect to the specific inboard bearing and the outboard bearing and seal assembly, together with the injection passageway for the olefin feed are illustrative of a preferred embodiment of the invention and are not to be interpreted as unduly restricting the invention. The essential feature of the invention is the injection of feed in fluid form to the reactor thru a sleeve along the impeller shaft and thru the inboard bearing so that it passes into the reaction area outside of the impeller hub skirt before contacting the catalyst in the reaction mixture. In this manner catalyst and polymer are prevented from entering the area between the hub and the bearing as well as the bearing itself, thereby avoiding polymer formation and deposition in the bearing and between the bearing assembly in the hub, which would interfere with the operation of the impeller.

A reactor such as that shown in the above-identified application (S.N. 819,391) comprising a 10″ loop with a 12″ L (23), was operated in the production of solid particle form ethylene polymer by periodically injecting a flushing fluid thru the inboard bearing. However, only 3 to 5 days of operation was possible before build up of polymer around the inboard bearing and impeller hub required shutdown, due to high impeller load, for cleaning off the polymer from the apparatus.

The apparatus was converted to the arrangement described in this application and has been in continuous operation for more than a month without any evidence of polymer build up in the inboard bearing and between the impeller hub and the inboard bearing housing. Ethylene flow thru the bearing sleeve was in the range of 400–500 standard cubic feet per hour. In addition 12.5 gallons per hour of n-pentane was introduced with the ethylene. The balance of diluent, 6.25 gallons per hour, was introduced with the catalyst.

Turbulent flow required in the hoop reatcor in making solid particle form polymer and maintaining same in suspension in the diluent (n-pentane) requires a minimum flow rate of at least about 6 ft./sec. and preferably about 10 ft./sec. The flow rate may run as high as 25 or 30 ft./sec. in larger diameter reactors such as 16″ to 20″.

Certain modifications of the invention will become apparent to those skilled in the art and the illustrative details disclosed are not to be construed as imposing unnecessary limitations on the invention.

I claim:
1. Apparatus comprising in combination:
   (a) a polymerazation vessel comprising an elongated cylindrical section having inlet means for fluid feed, an inlet for a mixture of catalyst and liquid diluent, and outlet means for polymer, and a curved section adjacent said cylindrical section;
   (b) an impeller shaft coaxial with said cylindrical section extending thru the wall of said curved section thru an outboard bearing fixed on said wall and sealed therewith;

(c) an impeller on the inner end of said shaft spaced substantially from said wall and provided with a hub having a skirt extending over the forward end of the housing of (d) toward said wall, said impeller being constructed to drive liquid reactant and polymer over said skirt;

(d) a separate inboard bearing on said shaft adjacent said hub enclosed within and supported by a housing and providing a first annular passageway therethru coaxial with said shaft, said housing being supported from the wall of the vessel of (a);

(e) a separate sleeve around said shaft extending from said inboard bearing into said outboard bearing providing a second annular passageway coaxial with said shaft and joining said first annular passageway, said sleeve and the housing of (d) substantially completely covering said shaft between said wall and said impeller;

(f) a passageway extending outwardly from the innermost end of said first annular passageway into said vessel, the terminal portion thereof passing rearwardly along said skirt; and (g) an inlet to said second annular passageway thru said outboard bearing for introducing polymerizable monomer as flushing fluid to flush said inboard bearing to prevent polymer deposition between said hub and said inboard bearing.

2. The apparatus of claim 1 wherein said vessel is a continuous loop conduit having an elongated cylindrical section upstream of a bend therein and the impeller of (b) is within and coaxial with said cylindrical section.

3. Polymerization apparatus comprising in combination:

(1) a reaction vessel in the form of a closed tubular loop having at least one bend in said loop and an elongated cylindrical section adjacent said bend, an inlet for catalyst and liquid feed, and an outlet for product polymer;

(2) an impeller positioned coaxially within the cylindrical section of (1) on the inner end of a drive shaft extending into said cylindrical section coaxially thereof thru the wall of said bend adapted to move liquid thru said loop toward said bend;

(3) an outboard bearing for the shaft of (2) attached to the outside wall of said bend providing an inlet therethru for additional liquid feed;

(4) a separate inboard bearing for the shaft of (2) positioned within the cylindrical section of (1) adjacent said impeller and spaced substantially from the outboard bearing of (3), there being a first annular passageway for said liquid feed thru said inboard bearing coaxially with said shaft;

(5) a housing enclosing and supporting said inboard bearing fixed to the wall of the cylindrical section of (1) in spaced-apart relation thereto providing an annulus therewith for flow of reactant liquid;

(6) a sleeve enclosing the entire section of the shaft of (2) intermediate the inboard bearing of (4) and the wall of said bend, said sleeve forming a second annular passageway with said shaft for said additional liquid feed connecting with the inlet of (3) and with the first annular passageway of (4);

(7) a skirt on the impeller of (2) extending rearwardly over the forward end of the housing of (5) and forming a radially then rearwardly extending passageway from the forward end of the first annular passageway of (4) into the annulus of (5), the foregoing structure cooperating to prevent polymer deposition on the portion of said shaft within said vessel.

4. The apparatus of claim 3 wherein said impeller is mounted on a hub provided with said skirt extending around the forward end of said housing in spaced apart relation thereto forming said radially and rearwardly extending passageway and said housing is supported by longitudinally and radially extending vanes to direct flow of fluid over said housing.

References Cited by the Examiner

UNITED STATES PATENTS

| | | | |
|---|---|---|---|
| 1,444,255 | 2/1923 | Lidholm | 23—285 X |
| 2,213,211 | 9/1940 | Fleckenstein et al. | |
| 2,351,091 | 6/1944 | Bar. | |
| 2,376,833 | 5/1945 | Teter. | |
| 2,428,411 | 10/1947 | Davis | 308—36.1 |
| 2,474,592 | 6/1949 | Palmer. | |
| 2,769,696 | 11/1956 | Litkenhous | 23—288 |
| 2,810,630 | 10/1957 | Herele | 23—285 |
| 2,824,090 | 2/1958 | Edwards et al. | 260—88.2 |
| 2,825,721 | 3/1958 | Hogan et al. | 260—88.2 |
| 2,832,674 | 4/1958 | Ranzenberger | 23—285 |
| 2,920,124 | 1/1960 | Stiles et al. | 23—285 X |
| 3,027,242 | 3/1962 | Webb | 23—285 |
| 3,034,868 | 5/1962 | Erickson | 23—252 X |
| 3,111,389 | 11/1963 | Hansen et al. | 23—285 X |

MORRIS O. WOLK, *Primary Examiner.*

MAYER LIEBMAN, GEORGE D. MITCHELL,
*Examiners.*

Dedication 3,226,205.—*Raymond G. Rohlfing*, Bartlesville, Okla. REACTOR IMPELLER WITH FEED INLET ALONG SHAFT. Patent dated Dec. 28, 1965. Dedication filed June 13, 1979, by the assignee, *Phillips Petroleum Company*.

Hereby dedicates the entire remaining term of said patent to the Public.
[*Official Gazette, March 18, 1980.*]